United States Patent
Hagiwara et al.

(10) Patent No.: US 10,225,118 B1
(45) Date of Patent: Mar. 5, 2019

(54) CARRIER LEAKAGE CORRECTION METHOD FOR QUADRATURE MODULATOR

(71) Applicants: Kabushiki Kaisha Toshiba, Minato-ku, Tokyo (JP); Toshiba Electronic Devices & Storage Corporation, Minato-ku, Tokyo (JP)

(72) Inventors: Yousuke Hagiwara, Kawasaki Kanagawa (JP); Shigehito Saigusa, Yokohama Kanagawa (JP); Mitsuyuki Ashida, Yokohama Kanagawa (JP); Yuki Fujimura, Ota Tokyo (JP); Ichiro Seto, Fuchu Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/901,043

(22) Filed: Feb. 21, 2018

(30) Foreign Application Priority Data

Sep. 22, 2017  (JP) ................................ 2017-182254

(51) Int. Cl.
*H04L 27/20* (2006.01)
*H04L 27/00* (2006.01)

(52) U.S. Cl.
CPC .......... *H04L 27/0014* (2013.01); *H04L 27/20* (2013.01); *H04L 2027/0018* (2013.01)

(58) Field of Classification Search
CPC .. H04L 27/0014; H04L 27/0018; H04L 27/20
USPC ................................ 375/259, 285, 295, 296
See application file for complete search history.

(56) References Cited

U.S. PATENT DOCUMENTS

| | | | |
|---|---|---|---|
| 7,831,220 B2 | 11/2010 | Hammerschmidt et al. | |
| 7,856,048 B1* | 12/2010 | Smaini ...................... | H04B 1/40 330/2 |
| 9,344,302 B2* | 5/2016 | Dhayni ................. | H04L 27/364 |
| 2002/0064237 A1* | 5/2002 | Shibata ..................... | H03C 3/40 375/302 |
| 2004/0165678 A1* | 8/2004 | Nadiri ...................... | H04L 1/244 375/296 |
| 2008/0187035 A1* | 8/2008 | Nakamura ............ | H03F 1/0288 375/232 |
| 2009/0054007 A1* | 2/2009 | Kawabe ................... | H04B 1/30 455/76 |
| 2010/0120369 A1* | 5/2010 | Ko .......................... | H03D 7/168 455/67.11 |
| 2012/0250790 A1* | 10/2012 | Yang ..................... | H03F 1/3247 375/296 |

(Continued)

*Primary Examiner* — Siu M Lee
(74) *Attorney, Agent, or Firm* — White & Case LLP

(57) ABSTRACT

A carrier leakage correction method for a quadrature modulator according to an embodiment includes inputting a test signal with a frequency $f_{BB}$ to a transmitter and up-converting the test signal with a frequency $f_{LO}$ and down-converting with the frequency $f_{LO}$. A frequency $2f_{BB}$ component is detected in the down-converted test signal. One or a plurality of parameters of the transmitter is/are adjusted so as to reduce a magnitude of the detected frequency $2f_{BB}$ component in the test signal.

6 Claims, 6 Drawing Sheets

(56) References Cited

U.S. PATENT DOCUMENTS

| | | | | |
|---|---|---|---|---|
| 2012/0328041 A1* | 12/2012 | Chen | ............. | H04L 27/364 |
| | | | | 375/285 |
| 2015/0333850 A1* | 11/2015 | Myoung | .......... | H04B 17/11 |
| | | | | 455/84 |
| 2016/0056764 A1* | 2/2016 | Tham | ............. | H03D 3/008 |
| | | | | 327/355 |
| 2016/0204881 A1* | 7/2016 | Chung | ............ | H04B 17/00 |
| | | | | 455/67.14 |

* cited by examiner

US 10,225,118 B1

CARRIER LEAKAGE CORRECTION METHOD FOR QUADRATURE MODULATOR

CROSS-REFERENCE TO RELATED APPLICATIONS

This application is based upon and claims the benefit of priority from the prior Japanese Patent Application No. 2017-182254 filed on Sep. 22, 2017, the entire contents of which are incorporated herein by reference.

FIELD

An embodiment described herein relates generally to a carrier leakage correction method for a quadrature modulator.

BACKGROUND

A quadrature modulation scheme in which a carrier is modulated using an orthogonal baseband signal is widely used among mobile communication terminals such as cellular phones. In the quadrature modulation scheme, when a DC offset is included in an I/Q baseband signal of a quadrature modulator, an unnecessary carrier component called a "carrier leakage" is outputted. A large carrier leakage to signal ratio may cause deterioration of modulation accuracy or an increase of demodulation errors on a demodulator side.

In order to solve these problems, a method is proposed whereby a magnitude of a carrier leakage component with respect to a desired signal component is monitored through envelope detection and feedback control is performed so as to reduce the carrier leakage component.

However, when performing feedback control while monitoring the magnitude of the carrier leakage component through envelope detection, it is necessary to mount an envelope detector, a high-pass filter for DC cutting, a variable amplifier for level adjustment and an ADC that can detect a single-ended signal. This results in an increase in a circuit scale and a circuit area of the quadrature modulator, which may cause a problem that the size of the apparatus increases.

DETAILED DESCRIPTION

A carrier leakage correction method according to a present embodiment is configured to input a test signal of a first frequency to a transmitter, up-convert the test signal at a second frequency and down-convert the up-converted test signal at the second frequency. In the down-converted test signal, a frequency component twice the first frequency is detected. Furthermore, one or a plurality of parameters of the transmitter adjusted so as to reduce the magnitude of the frequency component twice the first frequency detected in the test signal.

Hereinafter, the embodiment will be described with reference to the accompanying drawings.

Figure 1:
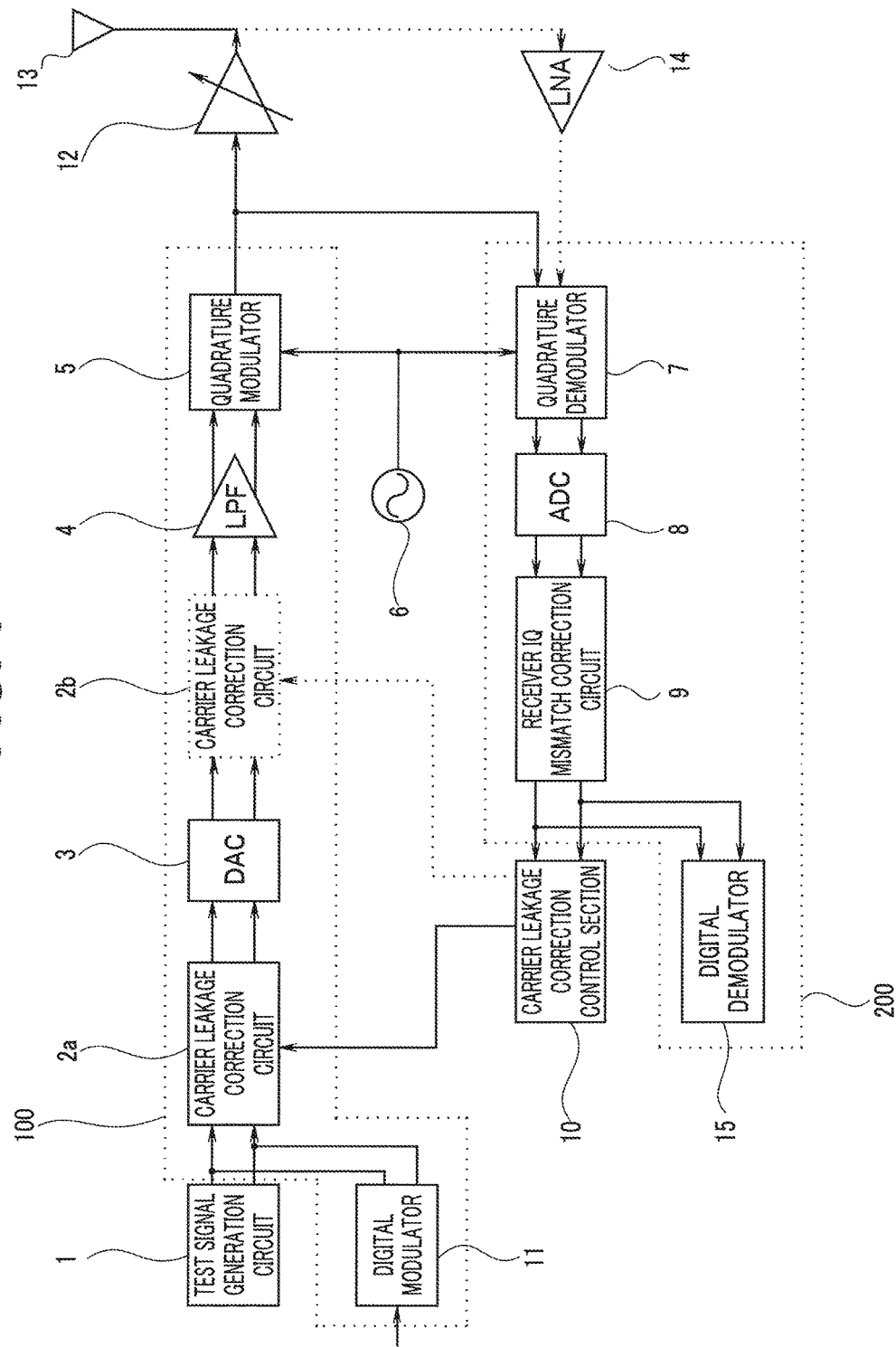
FIG. 1 is a schematic block diagram illustrating an example of a configuration of a radio communication apparatus including a quadrature modulator according to a present embodiment.

FIG. 1 is a schematic block diagram illustrating an example of a configuration of a radio communication apparatus including a quadrature modulator according to the present embodiment. The quadrature modulator is provided in, for example, a radio communication apparatus which is a radio transmitter and also a radio receiver. The radio communication apparatus includes a test signal generation circuit 1, a transmitting section 100, a power amplifier 12, an antenna 13, a low noise amplifier (hereinafter abbreviated as "LNA") 14, a local oscillator 6, a receiving section 200, and a carrier leakage correction control section 10.

The transmitting section 100 is mainly constructed of a digital modulator 11, a carrier leakage correction circuit 2a, a digital analog converter (hereinafter abbreviated as "DAC") 3, a low-pass filter (hereinafter abbreviated as "LPF") 4, and a quadrature modulator 5.

The receiving section 200 is mainly constructed of a quadrature demodulator 7, an analog digital converter (hereinafter abbreviated as "ADC") 8, a receiver IQ mismatch correction circuit 9, and a digital demodulator 15.

During carrier leakage correction, the test signal generation circuit 1 generates a test signal to be used for carrier leakage correction of the quadrature modulator and outputs the test signal to the carrier leakage correction circuit 2a The test signal is made up of a digital I signal (frequency $f_{BB}$) which has the same phase (in-phase component) as that of a radio wave (carrier) wirelessly transmitted from the antenna 13 and a digital Q signal (frequency $f_{BB}$) which has a phase orthogonal to a phase of a carrier (quadrature component).

During normal radio communication, the digital modulator 11 generates a digital I signal (frequency $f_{BB}$) which is an in-phase component of the carrier and a digital Q signal (frequency $f_{BB}$) which is a quadrature component of the carrier based on an inputted transmission data string and outputs the digital I signal and the digital Q signal to the carrier leakage correction circuit 2a.

The carrier leakage correction circuit 2a performs carrier leakage correction on the inputted digital I signal and digital Q signal. Note that the carrier leakage is an unnecessary signal component generated mainly due to a DC offset in a baseband signal (I signal and Q signal which are transmission signals). The carrier leakage correction circuit 2a adjusts values of the I signal and/or the Q signal according to a control signal inputted from the carrier leakage correction control section 10. The adjusted digital I signal and digital Q signal are outputted to the DAC 3.

Note that the carrier leakage correction circuit 2a also has a transmitter IQ mismatch correction function. Note that the IQ mismatch refers to loss of normal orthogonality caused by an amplitude difference or a phase difference between the I signal and the Q signal. When an IQ mismatch exists, an unnecessary signal component (image component) is generated, causing the quality of a modulated signal to deteriorate. The carrier leakage correction circuit 2a is configured to perform carrier leakage correction on an input signal and then perform transmitter IQ mismatch correction using a publicly known technique.

The DAC 3 is configured to convert a digital I signal to an analog I signal, convert a digital Q signal to an analog Q signal and output the analog signals to the LPF 4. Note that the transmitting section 100 may also be provided with a carrier leakage correction circuit 2b which is configured to perform carrier leakage correction on an analog signal. When the carrier leakage correction circuit 2b is provided, the DAC 3 outputs the converted analog I signal and analog Q signal to the carrier leakage correction circuit 2b.

Figure 2:
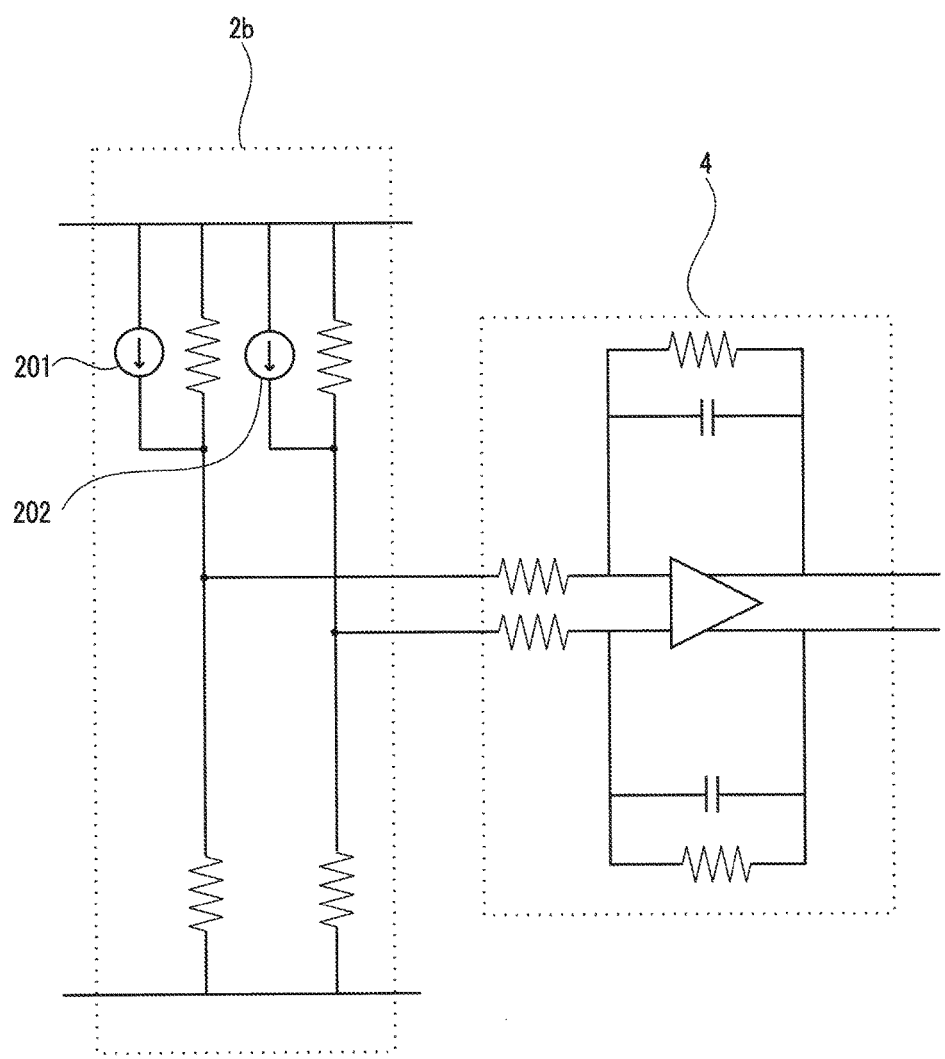
FIG. 2 is a circuit diagram illustrating an example of a detailed configuration of a carrier leakage correction circuit 2b.

The carrier leakage correction circuit 2b is configured to perform carrier leakage correction on the inputted analog I signal and analog Q signal. FIG. 2 is a circuit diagram illustrating an example of a detailed configuration of the carrier leakage correction circuit 2b. The carrier leakage correction circuit 2b includes, for example, two current sources 201 and 202. The carrier leakage correction circuit 2b adjusts values of currents outputted from the current sources 201 and 202 according to a control signal inputted from the carrier leakage correction control section 10 and injects correction currents to the I signal and/or the Q signal. After unnecessary high-frequency components are cut by the LPF 4, the adjusted analog I signal and analog Q signal are inputted to the quadrature modulator 5.

Note that in the case of a radio communication apparatus not provided with the carrier leakage correction circuit 2b, after unnecessary high-frequency components are cut by the LPF 4, the adjusted analog I signal and analog Q signal outputted from the DAC 3 are inputted to the quadrature modulator 5.

The quadrature modulator 5 is configured to receive a local signal (frequency $f_{LO}$) for generating a carrier signal from the local oscillator 6 in addition to the adjusted baseband signal inputted from the LPF 4. The quadrature modulator 5 includes a phase shifter (not shown) to shift the phase of the local signal by 90 degrees. The quadrature modulator 5 multiplies the inputted analog I signal by the local signal and multiplies the inputted analog Q signal by a signal obtained by shifting the phase of the local signal by 90 degrees using the phase shifter. By adding up these multiplied signals, the baseband signal is up-converted and a modulated signal is generated.

The modulated signal generated in the quadrature modulator 5 is inputted to the power amplifier 12 and the quadrature demodulator 7 of the receiving section 200. During normal radio communication, the baseband signal supplied from the digital modulator 11 is inputted to the power amplifier 12. The modulated signal outputted to the power amplifier 12 is amplified up to a necessary output value and then wirelessly transmitted from the antenna 13. During carrier leakage correction, the baseband signal supplied from the test signal generation circuit 1 is inputted to the quadrature demodulator 7 of the receiving section 200.

The quadrature demodulator 7 is configured to down-convert the inputted modulated signal using the local signal (frequency $f_{LO}$) inputted from the local oscillator 6 and generate an analog I signal an analog Q signal. During normal radio communication, the quadrature demodulator 7 receives a modulated signal which is a signal received by the antenna 13 and amplified by an LNA 14 with low noise. During carrier leakage correction, the quadrature demodulator 7 receives a modulated signal generated in the quadrature modulator 5.

The quadrature demodulator 7 receives the local signal (frequency $f_{LO}$) from the local oscillator 6 in addition to the modulated signal. The quadrature demodulator 7 includes a phase shifter (not shown) that shifts the phase of the local signal by 90 degrees. By multiplying the modulated signal by the local signal, the quadrature demodulator 7 generates an analog I signal of an in-phase component of the modulated signal and outputs the analog I signal to the ADC 8. Furthermore, by multiplying the modulated signal by a signal obtained by shifting the phase of the local signal by 90 degrees using the phase shifter, the quadrature demodulator 7 generates an analog Q signal of the quadrature component of the modulated signal and outputs the analog Q signal to the ADC 8.

The ADC 8 converts the analog I signal to a digital I signal or converts the analog Q signal to a digital Q signal respectively, and outputs the converted signals to the receiver IQ mismatch correction circuit 9. The receiver IQ mismatch correction circuit 9 corrects an IQ mismatch caused by a characteristic difference between the path of an I signal and the path of a Q signal in the quadrature demodulator 7 and the receiving section 200. The IQ mismatch can be corrected using a publicly known technique.

The digital I signal and the digital Q signal corrected by the receiver IQ mismatch correction circuit 9 are inputted to the digital demodulator 15 and the carrier leakage correction control section 10. During normal radio communication, the I signal and the Q signal obtained by demodulating the modulated signals received by the antenna 13 are inputted to the digital demodulator 15. During carrier leakage correction, the I signal and the Q signal obtained by demodulating the modulated signal generated from the baseband signal supplied from the test signal generation circuit 1 are inputted to the carrier leakage correction control section 10.

The carrier leakage correction control section 10 extracts frequency components proportional to a carrier leakage level from the inputted I signal and Q signal and inputs control signals to the carrier leakage correction circuits 2a and 2b so as to minimize the frequency components.

Figure 3A:
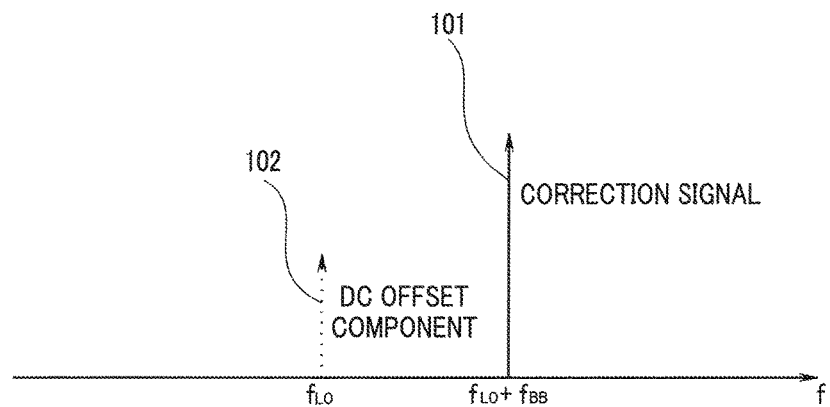
FIG. 3A illustrating a frequency distribution of a modulated signal after quadrature modulation having a carrier leakage component.
Figure 3B:
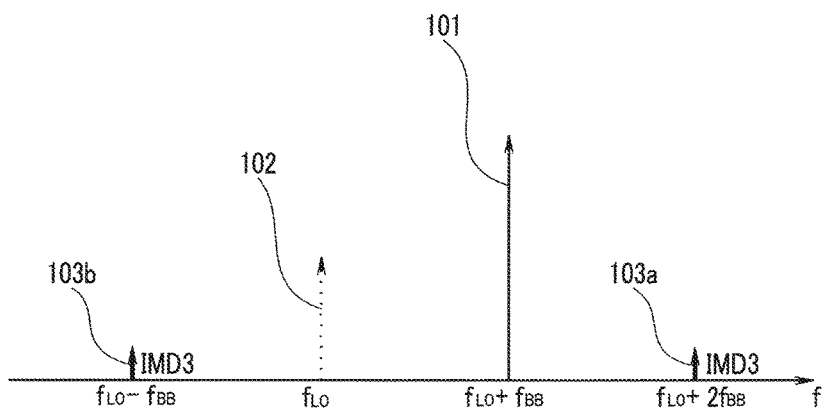
FIG. 3B illustrating a frequency distribution generated when the modulated signal shown in FIG. 3A is inputted to a circuit with a nonlinear input/output characteristic.
Figure 3C:
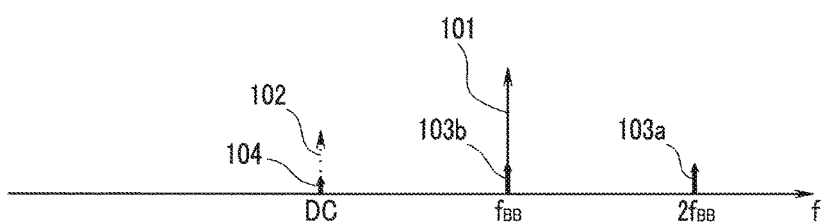
FIG. 3C illustrating a frequency distribution of an I/Q signal when the modulated signal shown in FIG. 3B is demodulated.

FIG. 3 is a diagram illustrating a frequency distribution of each signal. FIG. 3A illustrates a frequency distribution of a modulated signal after quadrature modulation having a carrier leakage component. FIG. 3B illustrates a frequency distribution generated when the modulated signal shown in FIG. 3A is inputted to a circuit with a nonlinear input/output characteristic. Furthermore, FIG. 3C illustrates a frequency distribution of an I/Q signal when the modulated signal shown in FIG. 3B is demodulated.

As shown in FIG. 3A, the modulated signal obtained by quadrature-modulating the baseband signal with no IQ mismatch and having only a DC offset component includes a correction signal 101 at a frequency $f_{LO}+f_{BB}$ and a component 102 caused by carrier leakage at a frequency $f_{LO}$.

In general, when two signals of different frequencies are inputted to a circuit with a nonlinear input/output characteristic, intermodulation distortion (hereinafter, abbreviated as "IMD") occurs. As a result, a component caused by IMD is generated at a frequency different from frequencies of the input signals.

When an input signal $x(t)=s_1(t)+s_2(t)$ composed of a signal with a frequency $f_1$, $s_1(t)=A_1 \cos 2\pi f_1 t$ and a signal with frequency $f_2$, $s_2(t)=A_2 \cos 2\pi f_2 t$ is inputted to a non-linear circuit, an output signal $y(t)$ is expressed by the following equation (1):

$$y(t) = a_1 A_1 \left[1 + \frac{3a_3}{4a_1}A_1^2 + \frac{3a_3}{2a_1}A_2^2\right]\cos 2\pi f_1 t + $$
$$a_1 A_2 \left[1 + \frac{3a_3}{4a_1}A_2^2 + \frac{3a_3}{2a_1}A_1^2\right]\cos 2\pi f_2 t + $$
$$a_2 A_1 A_2 [\cos 2\pi(f_1+f_2)t + \cos 2\pi(f_1-f_2)t] + $$
$$\frac{3}{4}a_3[A_1^2 A_2 \cos 2\pi(2f_1 \pm f_2)t + A_1 A_2^2 \cos 2\pi(2f_2 \pm f_1)t] + \ldots$$

equation (1)

In equation (1), the fourth term becomes a third-order intermodulation distortion component (IMD 3).

It is difficult to achieve a completely linear input/output characteristic for the quadrature modulator 5 and a certain degree of distortion may occur in an output signal. Therefore, if it is assumed that $s_1(t)$ is a correction signal with a frequency $f_{LO}+f_{BB}$ and $s_2(t)$ is a signal caused by carrier leakage with a frequency $f_{LO}$, a third-order intermodulation distortion component (IMD 3) of the output signal from the quadrature modulator 5 appears at four frequencies of $3f_{LO}+2f_{BB}$ ($=2f_1+f_2$), $f_{LO}+2f_{BB}$($=2f_1-f_2$), $3f_{LO}+f_{BB}$ ($=2f_2+f_1$) and $f_{LO}-f_{BB}$ ($=2f_2-f_1$). Of the four frequencies, since $3f_{LO}+2f_{BB}$ and $3f_{LO}+f_{BB}$ exist in a high-frequency band, $3f_{LO}+2f_{BB}$ and $3f_{LO}+f_{BB}$ are cut from the modulated signal outputted from the quadrature modulator 5 by an LPF (not shown) or the like.

Therefore, the frequency distribution of the modulated signal inputted from the quadrature demodulator 7 is as shown in FIG. 3B. That is, in addition to the correction signal 101 at the frequency $f_{LO}+f_{BB}$ and the component 102 caused by carrier leakage at the frequency $f_{LO}$, third-order intermodulation distortion components (IMD 3) 103a and 103b exist at a frequency $f_{LO}+2f_{BB}$ and a frequency $f_{LO}-f_{BB}$.

When the modulated signal having the characteristic shown in FIG. 3B is down-converted by the quadrature demodulator 7, an I signal and a Q signal having a frequency distribution shown in FIG. 3C are generated. That is, in the I signal and the Q signal, a correction signal 101 and a third-order intermodulation distortion component (IMD 3) 103b exist at a frequency $f_{BB}$, a third-order intermodulation distortion component (IMD 3) 103a exists at a frequency $2f_{BB}$ and a component 102 caused by carrier leakage exists at a frequency DC respectively.

Note that a DC offset is generated in the receiving section 200 just like the DC offset in the transmitting section 100. A component 104 caused by the DC offset in the receiving section 200 appears at a frequency DC just like the carrier leakage component 102 caused by the DC offset of the transmitting section 100.

That is, an I signal and a Q signal having the frequency distribution shown in FIG. 3C are inputted to the carrier leakage correction control section 10. A possible direct method for reducing carrier leakage may be one that measures a DC offset in the receiving section 200 in advance, subtracts the DC offset from a signal value at the frequency DC, thereby detects the component 102 caused by carrier leakage and performs control so as to minimize the component. However, when this method is used, a problem that detection accuracy of the carrier leakage component 102 deteriorates due to an influence of flicker noise (1/f noise) originating in transistor elements that constitute the circuit occurs.

Thus, taking advantage of the fact that the value of the third-order intermodulation distortion component (IMD 3) 103a appearing at the frequency $2f_{BB}$ is proportional to a product of the correction signal 101 and the component 102 caused by carrier leakage, that is, proportional to the carrier leakage component 102, the present embodiment controls the carrier leakage correction circuits 2a and 2b so as to minimize the value of the third-order intermodulation distortion component (IMD 3) 103a appearing at the frequency $2f_{BB}$.

Figure 4:
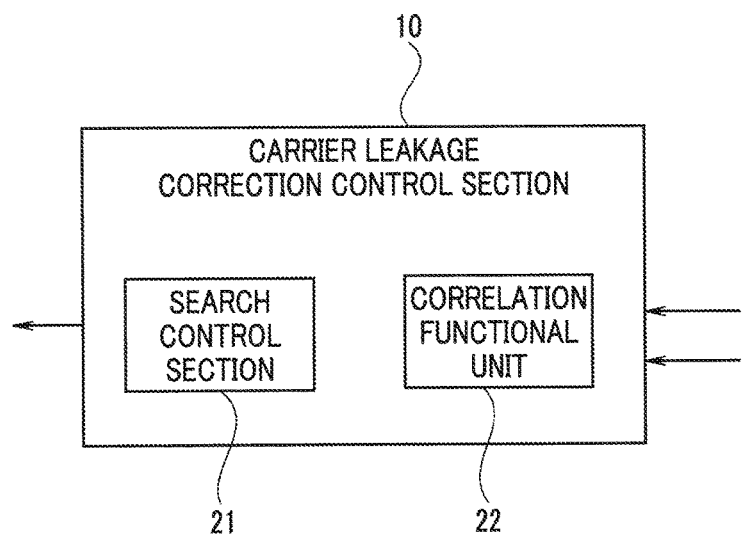
FIG. 4 is a block diagram illustrating an example of a configuration of a carrier leakage correction control section 10.

FIG. 4 is a block diagram illustrating an example of a configuration of the carrier leakage correction control section 10. The carrier leakage correction control section 10 includes a correlation functional unit 22 and a search control section 21.

Figure 5:
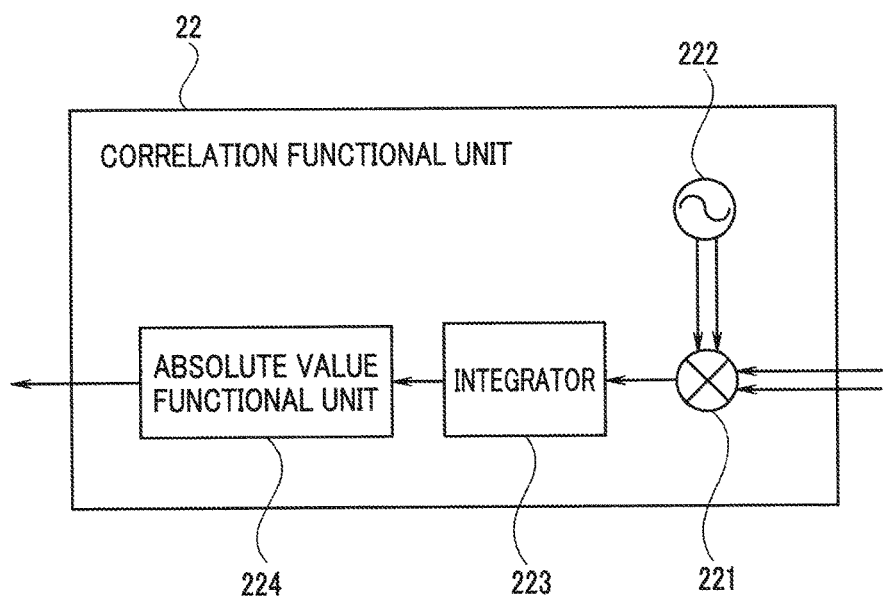
FIG. 5 is a block diagram illustrating an example of a detailed configuration of a correlation functional unit 22.

The correlation functional unit 22 is configured to detect a magnitude of the frequency $2f_{BB}$ component from an inputted signal. FIG. 5 is a block diagram illustrating an example of a detailed configuration of the correlation functional unit 22. The correlation functional unit 22 is constructed of an NCO (numerically controlled oscillator) 222, a multiplier 221, an integrator 223 and an absolute value functional unit 224.

The NCO (numerically controlled oscillator) 222 is configured to generate a sine wave with the frequency $2f_{BB}$ and output the sine wave to the multiplier 221. The multiplier 221 multiplies the I signal and the Q signal outputted from the receiver IQ mismatch correction circuit 9 by the inputted sine wave with the frequency $2f_{BB}$ and outputs the multiplication result to the integrator 223. The integrator 223 is configured to perform integration with a multiple of the cycle of $2f_{BB}$ on the inputted signal. The integrated value is inputted to the absolute value functional unit 224, the magnitude of the frequency $2f_{BB}$ component is calculated and outputted.

Note that the configuration of the correlation functional unit 22 is not limited to the configuration shown in FIG. 5, but another publicly known configuration may also be adopted. Furthermore, the magnitude of the frequency $2f_{BB}$ component may also be detected using techniques other than the correlation calculation such as FFT (fast Fourier transform).

The search control section 21 is configured to monitor the magnitude of the frequency $2f_{BB}$ component inputted from the correlation functional unit 22, adjust the value(s) of one or a plurality of parameters in the transmitting section 100 and control and instruct the carrier leakage correction circuits 2a and 2b so as to minimize the magnitude of the frequency $2f_{BB}$ component. Publicly known techniques such as a binary search method and a hill-climbing method can be used as the method for determining parameters to minimize the magnitude of the frequency $2f_{BB}$ component.

Figure 6:
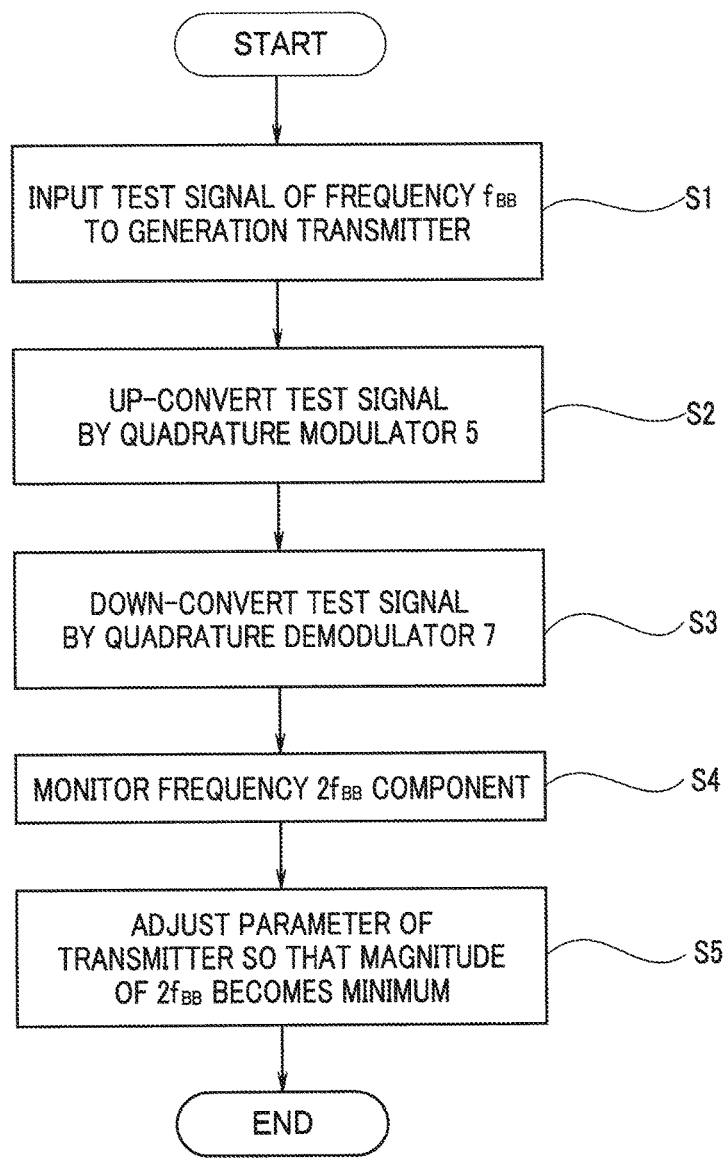
FIG. 6 is a flowchart describing an example of a carrier leakage correction procedure in the quadrature modulator.

Next, a carrier leakage correction method for the radio communication apparatus configured in this way will be described. FIG. 6 is a flowchart describing an example of a carrier leakage correction procedure for the quadrature modulator.

First, the test signal generation circuit 1 generates a test signal (baseband signal) with the frequency $f_{BB}$ and inputs the test signal to the transmitting section 100 (S1). The inputted test signal is subjected to predetermined processing at the carrier leakage correction circuit 2a, the DAC 3, (carrier leakage correction circuit 2b), and the LPF 4 and then inputted to the quadrature modulator 5. The quadrature modulator 5 up-converts the test signal using the local signal with the frequency $f_{LO}$ (S2).

The up-converted test signal is inputted to the quadrature demodulator 7 and down-converted using the local signal with the frequency $f_{LO}$ (S3). The down-converted test signal is subjected to predetermined processing at the ADC 8 and the receiver IQ mismatch correction circuit 9, and then inputted to the carrier leakage correction control section 10. The carrier leakage correction control section 10 monitors the value of the frequency $2f_{BB}$ component (S4).

The carrier leakage correction control section 10 adjusts the value(s) of one or a plurality of parameters in the transmitting section 100 so as to minimize the value of the monitored frequency $2f_{BB}$ component and performs feedback control on the carrier leakage correction circuit 2a (or 2b) (S5).

While the carrier leakage correction control section 10 is determining that the value of the frequency $2f_{BB}$ component is a minimum, the carrier leakage correction circuit 2a (or 2b) successively sets the respective parameter values of the transmitting section 100 and processes the inputted test signals. When it is determined in S5 that the value of the frequency $2f_{BB}$ component is a minimum, the parameter values in the transmitting section 100 are confirmed and a series of processes of carrier leakage correction is ended.

After carrier leakage correction has been made in this way, the input source of the baseband signal to be inputted to the transmitting section 100 is changed from the test signal generation circuit 1 to the digital modulator 11 and normal radio communication is performed.

Thus, the present embodiment performs carrier leakage correction by only adding a carrier leakage correction control section to the conventional radio communication apparatus configured to detect the frequency $2f_{BB}$ component and perform parameter control and instruction on the transmitting section so as to minimize the frequency $2f_{BB}$ component. That is, since a circuit mounted on a conventional radio communication apparatus is used for the mechanism for generating third-order distortion in an up-converted test signal and the mechanism for down-converting the test signal that causes third-order distortion, it is possible to inhibit an increase of the circuit scale or circuit area and prevent an increase in size of the apparatus.

Furthermore, since the magnitude of the carrier leakage component is detected not by the frequency DC but by the frequency $2f_{BB}$ component, it is possible to eliminate influences of flicker noise and accurately correct carrier leakage.

Note that when an IQ mismatch caused by an amplitude error or phase error occurs, an image component caused by the IQ mismatch appears at the frequency $f_{LO}-f_{BB}$ of the modulated signal. The frequency is the same as the frequency appearing in the third-order intermodulation distortion component (IMD 3) 103b. However, since carrier leakage correction is conducted using the third-order intermodulation distortion component (IMD 3) 103a appearing at the frequency $f_{LO}+2f_{BB}$, even when an IQ mismatch occurs, this has no influence on correction accuracy.

On the other hand, conducting carrier leakage correction can minimize the third-order intermodulation distortion component (IMD 3) 103b appearing at the frequency $f_{LO}-f_{BB}$. That is, the component appearing at the frequency $f_{LO}-f_{BB}$ after the carrier leakage correction can be said to be the component caused by the IQ mismatch. Therefore, the IQ mismatch can also be corrected accurately by correcting the IQ mismatch while monitoring the component appearing at the frequency $f_{LO}-f_{BB}$ after carrier leakage correction. For this reason, as described above, the carrier leakage correction circuits 2a and 2b perform transmitter IQ mismatch correction after carrier leakage correction.

Figure 7:
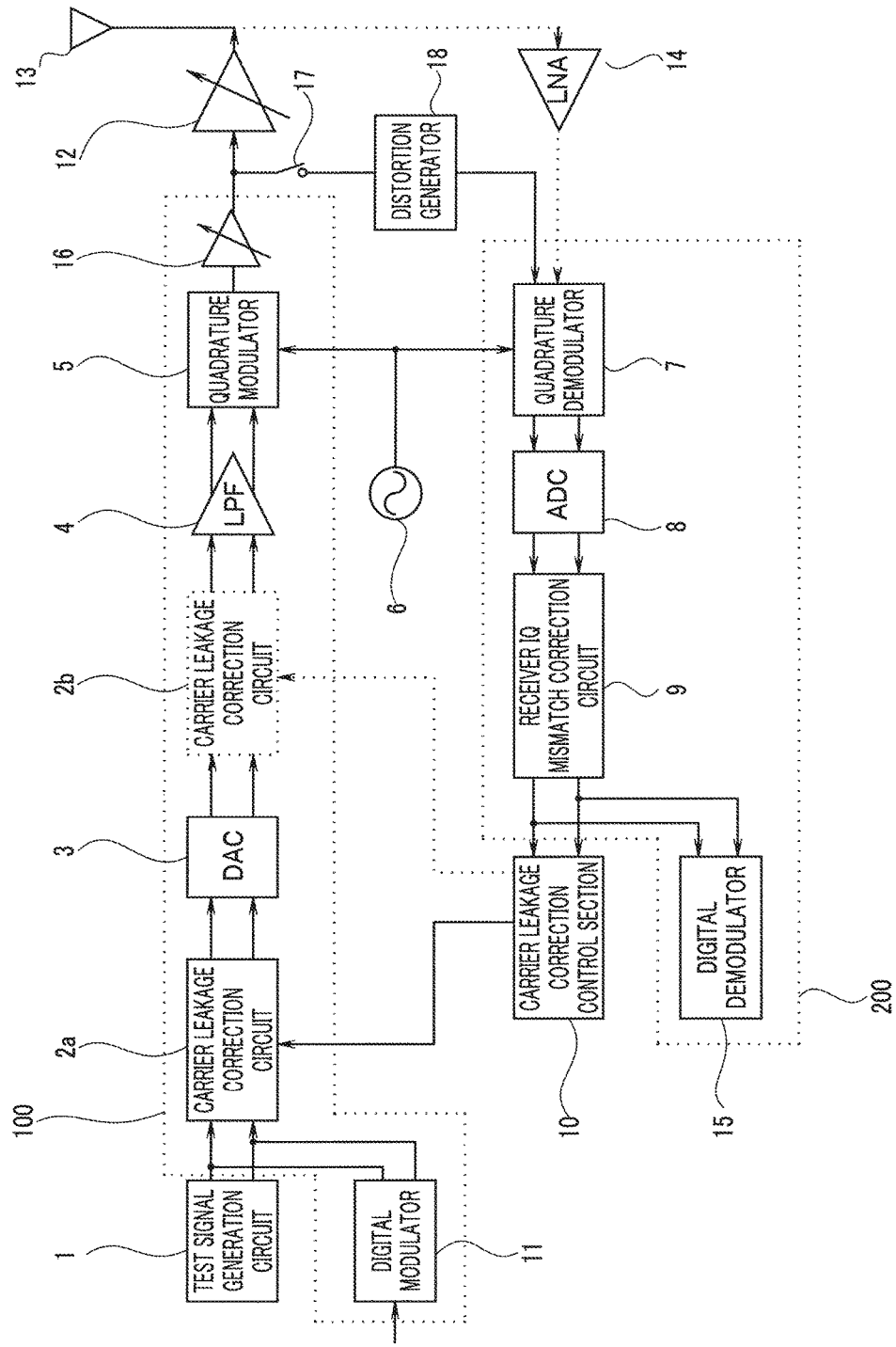
FIG. 7 is a schematic block diagram illustrating an example of another configuration of the radio communication apparatus including the quadrature modulator according to the present embodiment.

Note that distortion naturally generated in the modulated signal is used by taking advantage of nonlinearity of each circuit in the existing transmitting section 100 above, but a mechanism for generating distortion may be added to the existing circuit. FIG. 7 is a schematic block diagram illustrating an example of another configuration of the radio communication apparatus including the quadrature modulator according to the present embodiment. The radio communication apparatus shown in FIG. 7 is further provided with a driver amplifier 16, a changeover switch 17 and a distortion generator 18 in addition to the components illustrated in FIG. 1.

During normal radio communication, the changeover switch 17 is set to OFF and the modulated signal outputted from the quadrature modulator 5 is not fed back to the quadrature demodulator 7. The changeover switch 17 is set to ON only during carrier leakage correction and a modulated signal generated by up-converting the test signal outputted from the test signal generation circuit 1 is inputted to the quadrature demodulator 7 via the distortion generator 18.

Since the distortion generator 18 can increase the distortion component of the modulated signal, the frequency $2f_{BB}$ component detected by the carrier leakage correction control section 10 increases, and correction accuracy can thereby be improved. Note that not only the distortion generator 18 but also the quadrature modulator 5 and the driver amplifier 16 can be configured to increase distortion.

Each "section" in the present specification is a conceptual one corresponding to each function of the embodiment, and does not always have a one-to-one correspondence with a specific hardware or software routine. Therefore, in the present specification, virtual circuit blocks (sections) having the respective functions of the embodiment have been assumed and described.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A carrier leakage correction method for a quadrature modulator, the method comprising:
   inputting a test signal with a first frequency to a transmitter and up-converting the test signal with a second frequency;
   down-converting the up-converted test signal with the second frequency;
   detecting a frequency component twice the first frequency in the down-converted test signal; and
   adjusting one or a plurality of parameters of the transmitter so as to reduce a magnitude of the detected frequency component twice the first frequency in the down-converted test signal.

2. The carrier leakage correction method for a quadrature modulator according to claim 1, wherein after the transmitter is adjusted to increase a distortion component of the up-converted test signal, the up-converted test signal is down-converted with the second frequency.

3. The carrier leakage correction method for a quadrature modulator according to claim 1, wherein after increasing a distortion component of the up-converted test signal using a distortion generator, the up-converted test signal is down-converted with the second frequency.

4. The carrier leakage correction method for a quadrature modulator according to claim 1, wherein after adjusting one or a plurality of parameters of the transmitter so as to reduce the magnitude of the detected frequency component twice the first frequency, an IQ mismatch in the transmitter is corrected.

5. The carrier leakage correction method for a quadrature modulator according to claim 2, wherein after adjusting one or a plurality of parameters of the transmitter so as to reduce the magnitude of the detected frequency component twice the first frequency, an IQ mismatch in the transmitter is corrected.

6. The carrier leakage correction method for a quadrature modulator according to claim 3, wherein after adjusting one or a plurality of parameters of the transmitter so as to reduce the magnitude of the detected frequency component twice the first frequency, an IQ mismatch in the transmitter is corrected.

* * * * *